(12) United States Patent
Fahlman

(10) Patent No.: US 7,556,789 B2
(45) Date of Patent: Jul. 7, 2009

(54) LOW TEMPERATURE SYNTHESIS OF CARBON NANOTUBES

(75) Inventor: Bradley D. Fahlman, Mount Pleasant, MI (US)

(73) Assignee: Central Michigan University Board of Trustees, Mt. Pleasant, MI (US)

( * ) Notice: Subject to any disclaimer, the term of this patent is extended or adjusted under 35 U.S.C. 154(b) by 628 days.

(21) Appl. No.: 10/556,513

(22) PCT Filed: May 14, 2004

(86) PCT No.: PCT/US2004/015289

§ 371 (c)(1),
(2), (4) Date: Nov. 11, 2005

(87) PCT Pub. No.: WO2004/103904

PCT Pub. Date: Dec. 2, 2004

(65) Prior Publication Data

US 2006/0251568 A1 Nov. 9, 2006

(51) Int. Cl.
*D01F 9/127* (2006.01)

(52) U.S. Cl. .................................. 423/447.3; 977/843

(58) Field of Classification Search .............. 423/447.1, 423/447.3; 977/842, 843; 502/152, 154
See application file for complete search history.

(56) References Cited

OTHER PUBLICATIONS

Crooks et al., "Dendrimer-Encapsulated Metal Nanoparticles: Synthesis, Characterization, and Applications to Catalysis," vol. 34, No. 3, 2001 / Accounts of Chemical Research, pp. 181-190.*
C. Journet, P. Bernier: "Production of carbon nanotubes", Appl. Phys. A 67, pp. 1-9 (1998).
Wang, Xinjun et al "A novel route to multiwalled carbon nanotubes and carbon nanorods at low temperature", Journal of Physical Chemistry, B, Materials, Surfaces, Interfaces and Biophysical, Washington DC, US, vol. 106, No. 5, Feb. 7, 2002, pp. 933-937, XP002274787; ISSN: 1089-5647.
Jiang, Yang et al: "A Catalytic-Assembly Solvothermal Route to Multiwall Carbon Nanotubes at a Moderate Temperature", Journal of the American Chemical Society, 122 (49), 12383-12384, Coden: JACSAT: ISSN: 0002-7863, 2000, XP002299840.
Gang Hu et al: "Synthesis of carbon nanotube bundles with mesoporous structure by a self-assembly solvothermal route", Chemistry of Materials, vol. 15, No. 7, Apr. 8, 2003, pp. 1470-1473, XP002299841; ISSN: 0897-4756.
Hee Cheul Choi et al: Delivery of catalytic metal species onto surfaces with dendrimer carriers for the synthesis of carbon nanotubes with narrow diameter distribution:, Journal of Physical Chemistry B, vol. 106, No. 48, Dec. 5, 2002, pp. 12361-12365, XP002299842; ISSN: 1089-5647, p. 12362.
Mingwang Shao et al: "Benzene-thermal route to carbon nanotubes at a moderate temperature", Carbon Elsevier UK, vol. 40, No. 15, 2000, pp. 2961-2963, XP002299843; ISSN: 0008-6223.
J. L. O'Loughlin, et al: "Rapid Synthesis of Carbon Nanotubes by Solid-State Metathesis Reactions", J. Phys. Chem. B 2001, 105, 1921-1924, Published on Web Feb. 20, 2001.
P. Hollister, et al: "Dendrimers—Technology White Papers nr. 6", Cientifica, Ltd., Oct. 2003.

* cited by examiner

*Primary Examiner*—Wayne Langel
*Assistant Examiner*—Brittany M Martinez
(74) *Attorney, Agent, or Firm*—Harness, Dickey & Pierce, P.L.C.

(57) ABSTRACT

This invention provides: 1) methods for the identification of broad spectrum holins with a high level of nonenzymatic activity in membranes; 2) conditions required for maintaining and increasing the anti-microbial and anti-pest efficacy of holins in gene fusions; 3) a method for effective targeting of holins expressed in plants through use of leader peptide to direct the holin protein in the plant apoplast and xylem; 4) methods for the control of bacterial and fungal diseases of plants and control of insect and nematode pests that attack plants by expression of gene fusion involving holins, C-terminal additions and leader peptides, and optionally, endolysis; 5) methods for increasing the shelf of cut flowers, and 6) transgenic plants useful for the production of novel antimicrobial proteins based upon holins.

81 Claims, No Drawings

LOW TEMPERATURE SYNTHESIS OF CARBON NANOTUBES

CROSS REFERENCE TO RELATED APPLICATIONS

This application claims the benefit of U.S. provisional application 60/470,390, filed on May 14, 2003.

BACKGROUND OF THE INVENTION

The present invention relates to carbon nanotubes, and methods for their synthesis. In particular, the present invention provides catalysts and conditions for low temperature synthesis.

Carbon nanotubes ("CNTs") are helical microtubules of graphitic carbon. CNTs are of particular technical and commercial attention in part because of interesting and sometimes unique properties that make them attractive in many potential applications. For example, their high strength-to-weight ratio makes CNTs some of the strongest materials ever made. Whereas traditional carbon fibers have a strength-to-weight ratio about forty times that of steel, CNTs have a strength-to-weight ratio of at least two orders of magnitude greater than steel. CNTs and other tubular nanostructures with tunable dimensions below 100 nm are of increasing interest for applications such as molecular electronic devices, field-emission display panels, hydrogen storage, and micro-electromechanical systems (MEMS). There is significant worldwide research related to improving CNT synthetic methodology to improve yields and lower overall cost.

The simplest carbon nanotubes ("SWNTs") are single-walled, formed from a graphitic sheet rolled up on itself with a helical pitch and joined seamlessly at the edges. Frequently, such tubes are a closed with a conical cap, having diameters of from 10 to 20 Angstroms. Multi-walled carbon nanotubes ("MWNTs") are consist of a plurality of concentric tubes, each formed by closure of a graphitic sheet, with the distance between concentric tubes being about 0.34 nm. MWNTs may contain only two concentric tubes, or as many as fifty or more concentric tubes.

The preparation of CNTs is possible using diverse methods, such as those described in C. Journet and P. Bernier, Appl. Phys. A 67, 1-9 (1998). One method is through electric arc discharge generated between two closely spaced graphite electrodes in an inert atmosphere, such as helium or argon. A plasma, with a temperature on the order of 4000 K, is created between the electrodes, subliming carbon from the anode onto the cathode. Normally only MWNTs are formed by this method, but if a metal is introduced as a catalyst (e.g., Co, Ni, Fe, Lu, and combinations thereof) SWNTs may be formed. In another method, laser ablation is used to vaporize graphite in an inert atmosphere. In such methods, a laser beam is scanned across a heated graphite target area over which flows an inert gas such as helium or argon. Carbon species produced are swept by the gas onto a cooled target, e.g., copper.

High-temperature gas phase decomposition of hydrocarbons also can be utilized to form CNTs. For example, nitrogen containing 10% acetylene passed over a metal at 500-1100° C., resulting in the formation of multi-walled carbon nanotubes. Chemical vapor deposition (CVD) is the method of choice, partially due to its relatively inexpensive apparatus and facile industrial scale-up. Although CVD offers the additional benefit of significantly lower deposition temperatures than arc-based techniques, a temperature range of 700-1000° C. is still necessary, which precludes the use of temperature-sensitive substrates that may not withstand such deposition temperatures. Recently, growth of MWNT nanotubes and nanorods has been reported at 200° C. from benzene-thermal-reduction-catalysis (BTRC), which uses chlorine-containing precursors with in situ alkali metal facilitated reduction.

SUMMARY OF INVENTION

A method for synthesizing CNTs makes use of a catalyst that comprises a metal encapsulated macromolecule. In various embodiments, the reaction to form the CNTs is carried out at lower temperatures than reported heretofore. In one embodiment, the invention provides a low temperature method comprising decomposing a carbon source in a fluid in the presence of a catalyst where the catalyst catalyzes the formation of a carbon phase comprising nanotubes. The carbon source comprises a halogenated hydrocarbon, and the catalyst comprises a metal encapsulated macromolecule, wherein the metal is selected from the group consisting of Ti, V, Cr, Mn, Fe, Co, Ni, Cu, Mo, and W. In preferred embodiments, the catalyst comprises a metal encapsulated dendrimer molecule. Preferred dendrimer molecules include those that are amine functional, so that the metal is chelated, coordinated, encapsulated, or otherwise contained within the dendrimer molecule.

The fluid in which the reaction is carried out is either a supercritical fluid or a liquid. Supercritical fluids are those fluids that are used at temperatures and pressures above their critical temperature and critical pressure respectively. Non-limiting examples of supercritical fluids include carbon dioxide, krypton, xenon, ethane, methane, and propane. The term liquid is used to refer to materials in their liquid phase. Liquid phase materials useful as the fluid of the invention include well-known organic solvents. Preferred liquid solvents include inert organic solvents such as, without limitation, benzene and pentane.

The method of the invention may be carried out in a wide range of temperatures. In various embodiments, the temperature of reaction can be 200° C. or less. In other embodiments, the reaction may be carried out below 100° C., or below 85° C. In some embodiments, the reactions may be carried out to produce CNTs at room temperature and below.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

DETAILED DESCRIPTION

In one embodiment, the invention provides a low temperature method for synthesizing carbon nanotubes (CNTs). The method comprises decomposing a carbon source in a fluid in the presence of a catalyst under conditions where the catalyst catalyzes formation of a carbon phase comprising CNTs. The carbon source comprises a halogenated hydrocarbon and the catalyst comprises a metal encapsulated macromolecule, wherein the metal is selected from the group consisting of Ti, V, Cr, Mn, Fe, Co, Ni, Cu, Mo, and W. In a preferred embodiment, the method comprises decomposing the carbon source in the further presence of sacrificial metal. The sacrificial metal comprises a metallic compound provided in a form such that halogen from the decomposition of the carbon source reacts with the sacrificial metal. In preferred embodiments, halogen reacts with the sacrificial metal at a faster rate than any reaction occurring with the metal of the metal encapsulated macromolecule. Such action of the sacrificial metal thus protects the catalyst from degradation during the reaction and increases the rate and yield of formation of the carbon phase comprising nanotubes.

In one embodiment, the fluid in which the carbon source is decomposed is a supercritical fluid. The invention provides a method for synthesizing CNTs comprising heating a carbon source in a supercritical fluid in the presence of a catalyst and the sacrificial metal for a time and temperature sufficient to decompose the carbon source and form a carbon phase comprising nanotubes. The carbon source, sacrificial metal, and catalyst are as described above.

In another embodiment, the fluid for decomposing the carbon source is a liquid, preferably an inert organic solvent. The invention provides a method for synthesizing CNTs comprising contacting a solution of a carbon source in an organic solvent with a catalyst comprising a metal encapsulated macromolecule as described above. Preferably, the method is carried out in the further presence of an active metal that serves as the sacrificial metal described above. Contact is maintained for a time and at a temperature sufficient to decompose the carbon source and form a carbon phase comprising nanotubes. The metal encapsulated macromolecule catalyst is as described above. The sacrificial metal is preferably an active metal selected from the group consisting of sodium, potassium, magnesium, and calcium. The organic solvent is preferably inert in that it does not react with the active material during contact of the solution of the carbon source with the catalyst. The carbon source is preferably a halogenated hydrocarbon as described above.

In another embodiment, the invention provides a method for making CNTs comprising heating a carbon source in supercritical carbon dioxide in the presence of a sacrificial metal and a metal encapsulated macromolecule catalyst particle. The carbon source comprises a halogenated hydrocarbon, preferably a one-carbon halocarbon of formula $CX_4$, where X is independently selected from the group consisting of chlorine, bromine, and iodine. The sacrificial metal comprises a metallic element in the zero oxidation state that does not react with the carbon dioxide under supercritical conditions, and the metal encapsulated macromolecule comprises a metal selected from the group consisting of Ti, V, Cr, Mn, Fe, Co, Ni, Cu, Mo, and W.

In another embodiment, the invention provides a method for making CNTs comprising decomposing a compound of formula $CX_4$ in a fluid in the presence of a metal encapsulated macromolecule catalyst and a sacrificial metal. The fluid is selected from the group consisting of supercritical fluids and liquids, X is a halogen independently selected from the group consisting of chlorine, bromine, and iodine, and the metal encapsulated macromolecule catalyst comprises a zero oxidation state metal selected from the group consisting of Ti, V, Cr, Mn, Fe, Co, Ni, Cu, Mo, and W. The sacrificial metal comprises a metallic element that reacts with halogen from the decomposition of $CX_4$ but does not react with the fluid.

The macromolecules useful herein are capable of chelating, coordinating, encapsulating, or otherwise containing a metal such that the metal is capable of catalyzing the formation of a nanotube. Such macromolecules include dendrimers, hyperbranched molecules, calixarenes, crown ethers, cryptands, porphyrins, and mixtures thereof. (As used herein, the word "include," and its variants, is intended to be non-limiting, such that recitation of items in a list is not to the exclusion of other like items that may also be useful in the materials, compositions, devices, and methods of this invention.)

Dendrimers are particularly preferred macromolecules useful herein. (As used herein, the words "preferred" and "preferably" refer to embodiments of the invention that afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the invention.) In one embodiment, dendrimers are globular molecules consisting of a core that is surrounded by shells of repetitive branching units, having a tree-like or "generational" structure. Each dendrimer consists of a multifunctional core with a dendritic wedge attached at functional sites. The core molecule is referred to as Generation "0." Each successive repeat unit along all branches forms the next generation, i.e., Generation "1", Generation "2", etc., until the terminating Generation. Dendrimers among those useful herein include a wide variety of those that are commercially available and otherwise known in the art, including those made from polyether, polyester, polyamide, polyphenylene, polyphenylacetylene, and polysiloxane.

Dendrimers in general are large complex molecules with relatively well defined chemical structures. In various embodiments, the dendrimers are nearly monodisperse macromolecules with regular and highly branched three-dimensional structures. Dendrimers generally consist of a core, branches, and end groups.

Dendrimers includes those molecules produced in an iterated sequence of reaction steps in which each additional iteration leads to a higher generation dendrimer. In one embodiment, the dendrimers may be made from a "bottom-up" approach, where each new layer creates a new generation, with the number of active sites (or end groups) increasing in each generation. In many embodiments, the number of active sites doubles with every generation. The size, composition, and chemical reactivity of the dendrimers may be controlled during their synthesis.

In a preferred embodiment, the end groups or terminal active sites of the dendrimer is an amine group or a hydroxyl group. In various embodiments, terminal hydroxyls will facilitate the metal going into the interior of the dendrimer, rather than chelating on the surface. Non-limiting examples of amine-terminated dendrimers include poly(amidoamine) (PAMAM), and poly(propyleneimine) (PPI). PAMAM dendrimers may be synthesized starting from ammonia or ethylene diamine initiator core reagents. They are constructed using a reiterative sequence consisting of (a) a double Michael addition of methyl acrylate to a primary amino group and (b) amidation of the resulting carbomethoxy intermediate with a large excess of ethylenediamine. By repeating the sequence steps (a) and (b), products up to Generation "10" may be obtained. PPI dendrimers may be synthesized starting from a diaminoalkane such as 1,4-diaminobutane. They are grown by an iterative sequence consisting of (a) a double Michael addition of acrylonitrile to the primary amino groups of the diaminoalkane followed by (b) hydrogenation, for example under pressure in the presence of Raney cobalt. Products may be produced up to about Generation "5" using the sequence of steps (a) and (b). Dendrimers are commercially available, for example from Sigma Aldrich, DSM, or from Dendritic Nanotechnologies of Mt. Pleasant Mich.

Hyperbranched macromolecules are polydisperse polymeric materials made with similar iterative reaction sequences as those used to make dendrimers. In one aspect, a hyperbranched molecule or hyperbranched macromolecule has a core, branch structure, and terminal groups similar to those of the dendrimers, but are slightly more polydisperse in structure. For example, preferred hyperbranched molecules contain amine groups or hydroxyl groups as the end groups. While in dendrimer synthesis the precise stoichiometry of reactants in each generation is controlled to yield a precise synthesis, in hyperbranched molecules the conditions are not as rigorously controlled. Similar to dendrimers, the structure and ultimate physical/chemical properties of these polymers may be fine-tuned by varying the core and terminal groups. Such a similarity in properties allows this class of compounds to be suitable for the catalytic applications described herein. Hyperbranched macromolecules are commercially available, for example from BASF, Dendritech, and Aldrich.

In various embodiments, the dendrimers and hyperbranched molecules form a continuum of suitable forms to hold the metal atoms of the catalyst of the invention, the term dendrimer being used to represent those embodiments that are relatively more monodisperse. This continuum of suitable structures will be referred to as dendrimeric or a dendrimeric material.

To make the metal encapsulated macromolecule of the invention, a macromolecule such as the dendrimers and hyperbranched macromolecules described above is first reacted with a reagent containing a soluble metal. The metal in the reagent reacts with surface and/or interior Lewis-basic groups of the dendrimeric material, which in a preferred embodiment comprise amino groups. The soluble metal species are thus held on the dendrimeric material at the surface (exterior) or within the interior through chelating, encapsulating, or other binding relationships to primary, secondary, or tertiary amino groups. The synthesis of the metal encapsulated macromolecule catalyst is completed by reducing the soluble metal species, which is in general in an oxidation state of from +1 to +7, depending on the metal, to a ground state or "0" oxidation state. A number of reagents and reducing materials are known to carry out this reaction. Preferred reagents include those that react in solution with the metal species held on the macromolecule. In a preferred embodiment, sodium borohydride or a similar reducing agent is used to convert the soluble metal bound macromolecule to the catalyst containing the zero oxidation state metal. In a representative embodiment, the soluble metal bound macromolecule is prepared by reacting various concentrations of metal $M^{+n}$ with a dendrimer such as a Generation "4" PPI dendrimer in an ethanol solution. The metal cation is then reduced with sodium borohydride. If the reduced metal catalyst is insoluble, it precipitates during the reaction. The product may then be separated in a centrifuge and air dried to provide the metal encapsulated macromolecule catalyst of the invention. Depending on the solubility of the reduced-metal encapsulated dendrimer, precipitation may not occur. In these instances, the catalyst may be isolated through removal of the solvent and drying.

A wide variety of soluble metal salts corresponding to the metals of the catalyst is known. In general, chloride, nitrates, and other salts are readily soluble in water, ethanol and other solvents. A solution of the macromolecule and the metal salt is stirred together to make a structure wherein the metal ions are bound primarily to the amino groups of the preferred macromolecule. Upon subsequent reaction of the $M^{n+}$ bound macromolecules, the $M^{n+}$ cations are reduced in place to form $M^0$ atoms or elements held on the macromolecule to form the metal encapsulated macromolecule.

The amount of metal $M°$ held on the macromolecule—either in the interior or exterior—may be varied over a wide range by selecting the stoichiometry of the reactants. Generally a molar ratio of n: 1 metal to macromolecule is used, where n is sufficiently high to yield a macromolecule having a suitable amount of metal to catalyze the formation of CNTs. In the non-limiting example of a 4th generation PPI dendrimer, suitable catalysts can be made having n in the range of 8 to 32, as shown in the examples.

The diameter and globular size of the metal encapsulated macromolecule depends on the size of the macromolecule before the metal is incorporated. As discussed above, the size and diameter of dendrimer particles increases with every generation or iteration of steps of (a) and (b) described above. The diameter or size of the metal encapsulated macromolecule is preferably about 10 nm or less. Catalyst diameters on the order of 10 nm or less are more likely to yield nanotubes rather than nanorods and carbon fibers. In a preferred embodiment, the metal encapsulated macromolecule catalysts have a diameter of 3-5 nanometers. Such preferred diameters of the macromolecules may be reached in the case of PPI dendrimer by using a Generation "4" dendrimer.

In some embodiments, the diameter of the seed catalyst particle affects the diameter of the resultant CNTs. As long as significant agglomeration does not occur among individual macromolecular units, larger diameters can also be used for CNT growth, so long as the diameter is not so great that it tends to contribute to formation of nanorods, fibers, or amorphous carbon to an undesirable extent at the expense of the desired nanotubes.

Carbon sources useful in the invention include materials that degrade or decompose to form carbon materials that recombine to form CNTs in the presence of the metal encapsulated macromolecule catalyst described above. In a preferred embodiment, the carbon source comprises a halogenated hydrocarbon. The halogenated hydrocarbon decomposes to form carbon species and halogen species during the reaction. The halogenated hydrocarbon may be selected from a wide variety of chemical species. In one embodiment, the halogenated hydrocarbon may be partially halogenated, containing some carbon to hydrogen bonds. In other embodiments, the halogenated hydrocarbon is fully halogenated. Non-limiting examples of halogenated hydrocarbons include one carbon halocarbons such as carbon tetrachloride, and fluorinated olefins such as hexafluoropropylene, tetrafluoroethylene, vinylidene fluoride, and the like. The presence of carbon-hydrogen or carbon-fluorine bonds on the carbon source leads to the requirement of higher reaction temperatures, while the presence of carbon-chlorine, carbon-bromine, or carbon-iodine bonds leads to a requirement of lower temperatures.

In a preferred embodiment, the halogenated hydrocarbon is fully halogenated with chlorine, bromine, or iodine. Preferred carbon sources include one carbon and two carbon halogenated hydrocarbons. In one embodiment, the halogenated hydrocarbon has formula $CX_4$ wherein X is independently selected from the group consisting of hydrogen, fluorine, chlorine, bromine, and iodine; in a preferred embodiment X is independently selected from chlorine, bromine, and iodine. In another embodiment, the halogenated hydrocarbon has formula $C_2X'_4$ wherein X' is independently selected from hydrogen, fluorine, bromine, chlorine, and iodine. In a preferred embodiment, X' is independently selected from chlorine, bromine, and iodine. Non-limiting examples of $CX_4$ include carbon tetrachloride and carbon tetraiodide. Non-liming examples of $C_2X'_4$ include tetrachloroethylene.

In one embodiment, the fluid for carrying out the low temperature methods of the invention is a supercritical fluid. Supercritical fluids represent a phase or pseudo phase of matter having some of the characteristics of both a liquid and a gas. A chemical compound exists as a supercritical fluid at temperatures and pressures above the critical temperature and the critical pressure respectively. Most if not all chemical compounds exhibit a critical pressure above which a material in the liquid phase cannot be evaporated to form a gaseous phase no matter the temperature, and a critical temperature above which a gas cannot be condensed to a liquid no matter the pressure. For certain chemical compounds, including those that are normally gaseous or volatile liquids at atmospheric pressures and/or ambient temperatures, the supercritical conditions $T_c$ and $P_c$ can be reached in economical pressure temperature devices. Among such substances, which are preferred supercritical fluids for carrying out the low temperature methods of the invention, are carbon dioxide, ethane, methane, krypton, and xenon. For example, the critical temperature of carbon dioxide is 31° C. and the critical pressure is 73.8 bar. Such pressures are readily reachable with commercial pressurized reactors. Conveniently, liquid carbon dioxide may be introduced into a pressure reactor, and the contents of the pressurized reactor increased above the critical pressure and above the critical temperature to provide a supercritical carbon dioxide fluid.

In an alternative embodiment, the fluid is in the liquid phase. The liquid phase is the phase of matter that is in equilibrium with the gaseous phase at the boiling point. In a preferred embodiment, the liquid is an inert organic solvent. The solvent is inert in that it does not enter into undesirable reactions with the catalyst or the sacrificial metal present in the reaction system. In a preferred embodiment, the liquid is a hydrocarbon solvent, such as without limitation, benzene or pentane. To carry out the reactions of the invention, the materials may be stirred in the liquid at room temperature or higher. In one embodiment, the reaction is carried out while refluxing the solvent at atmospheric pressure. The temperature of the reaction then is given by the normal boiling point of the solvent. Alternatively, the reaction system may be enclosed in a pressure apparatus, such as a sealed glass tube, and the temperature raised above the boiling point of the solvent. For example, a sealed glass tube may be heated in an autoclave at 200° C., well above the boiling point of benzene or pentane.

In some embodiments, using a liquid as the fluid, it has been found that CNTs formed even at room temperature or below. In a preferred embodiment, the temperature of reaction is 200° C. or below, and preferably 100° C. or below.

It is generally preferred that low temperature methods of the invention be carried out in the further presence of a sacrificial metal. As described above, the sacrificial metal contains a metallic element that preferentially reacts with halogen from the decomposition of the carbon source, so that the metal-containing catalyst is not degraded during the reaction. For convenience, sacrificial metals may be provided in the form of elemental materials containing a metal in the zero oxidation state. Halogen from the decomposition of the carbon source reacts with the sacrificial metal to form metal chloride salts.

The metal of the sacrificial metal may be any material that does not react with the fluid or other components of the reaction system other than the halogen arising from decomposition of the carbon source. In various embodiments, the sacrificial metal may be selected from among the alkali metals or alkaline earth metals. Further, they may be selected from the transition metals, especially the first row transition metals of titanium to zinc inclusive.

In general, when reactions are to be carried out at lower temperatures, a more active metal may be required as the sacrificial metal. For example, for reactions carried out around room temperature (or even slightly below room temperature) up to about 200° C. in a liquid system such as those described above, it is preferred to use a sacrificial metal selected from the group consisting of active metals such as sodium, potassium, magnesium, and calcium. Further, it is desirable to avoid combinations of metals and fluids that have undesirable reactions. For example, supercritical carbon dioxide and active metals such as alkaline earths and alkali metals tend to react undesirably. In the case of supercritical carbon dioxide as the fluid, it is desirable to use less active metals such as preferably copper or zinc.

The sacrificial metal is preferably provided in an elemental form. For the active metals such as alkali metals and alkaline earths, it is conventional to provide them as blocks of material that are immersed in an inert solvent such as a mineral oil. Prior to use, the outside layers of the metals may be removed with a razor or other instrument to remove metal oxide and to expose the reactive zero state active metal. Less reactive metals are generally available in other forms such as, for example, metallic wire. For example, it is preferred to use copper and zinc in the form of wires that are wound around reaction vials or otherwise are placed in the reaction chamber. The sacrificial metal is preferably provided in stoichiometric excess in the reaction.

When the fluid is a liquid, the reaction can be carried out under conventional stirring with the catalyst, carbon source, and sacrificial metal all contained in the organic solvent. The sacrificial metal, in the form of a shaved block, powder, or wire is placed into the solvent along with the catalyst and the carbon source. The reaction is carried out, preferably with stirring or other agitation for a time and at a temperature sufficient to form a carbon phase comprising nanotubes from the decomposition products of the carbon source.

A carbon phase comprising CNTs is formed from the decomposition products of the carbon source in the presence of the catalyst of the invention. CNTs make up a crystalline phase of carbon. The presence of nanotubes in a carbon phase can be confirmed by microscopy where the nanotubes can be visualized and their length and diameter determined. In addition, the crystalline nanotube phase of carbon is characterized by unique spectroscopic characteristics, for example in Raman peaks at 1338 $cm^{-1}$ and 1559 $cm^{-1}$, as described in Jiang et al., J. American Chemical Society, 2000, Vol. 122, pgs 12383-12384. A reaction mixture containing carbon nanotubes may be directly analyzed "as deposited". It is conventional also to acid wash the reaction mixture to remove some non-nanotube material prior to microscopic or other analysis.

The invention has been described above with respect to various preferred embodiments. Further non-limiting description is given in the following examples.

EXAMPLES

Example 1

Synthesis of 16:1, Iron Encapsulated Dendrimer

Generation "4" PPI dendrimer, 0.4156 g (commercial product of Sigma-Aldrich) is dissolved in 20 mL of water. A separate solution is made by adding $FeCl_3.6H_2O$, 0.5123 g to 20 mL of water. The two solutions are combined and mixed for one hour. The solution becomes dark brown to red. A third solution is made by dissolving sodium borohydride, 0.3303 g in 15 mL of water. The sodium borohydride solution is added dropwise to the combined dendrimer/iron chloride solution. The solution turns brown to black, a noticeable solid forms, and gas evolves. The combined solutions are mixed one hour after the addition of the sodium borohydride. The reaction mixture is centrifuged and the solvent is decanted. The reaction product is black. The material is dried for 48 hours.

Example 2

Synthesis of 32:1, Iron Encapsulated Dendrimer

A first solution is made by adding 0.0928 g of Generation "4" PPI dendrimer to 8 mL of water. A second solution is made by adding 0.2288 g $FeCl_3.6H_2O$ to 7 mL water. The solutions are combined in a round bottom flask and mixed for one hour. A third solution is made by adding 0.168 g sodium borohydride to 8 mL of water. The third solution is added dropwise to the dendrimer iron chloride solution. The solution turns black. Mixing continues for one hour and the product is allowed to settle overnight. The product is recovered by centrifuging the liquid and drying the material for 48 hours.

Example 3

Synthesis of Carbon Nanotubes (CNTs)

In an inert atmosphere, 1.95 g of potassium, 8 mL of tetrachloroethylene, and 0.0760 g of the iron dendrimer of Example 2 are combined in a 50 mL high pressure tube containing 30 mL of benzene. After securing the tube with electrical tape, the solution is refluxed gently for 48 hours. The reaction mixture is poured into a flask with vacuum filtering to remove the benzene. 30 mL of t-butanol is added to destroy excess potassium. After vacuum filtering, 30 mL of methanol is added. After a second vacuum filtration, 30 mL of water is added to the material. After vacuum filtration, the product is washed several times with water. A total of 0.1603 g material is obtained.

The material is centrifuged and the solvent removed. The sample is taken up in ethanol; transmission electron microscopy shows the presence of CNTs having diameters of approximately 20 nm.

Example 4

Iron PPI Dendrimer CNT Growth (Room Temperature)

In a round bottom flask, 0.062 g of the iron dendrimer catalyst of Example 1, 12 mL benzene, 2.7 mL tetrachloroethylene, and 0.99 g potassium are combined in an inert atmosphere. Potassium is trimmed with a razor blade prior to combining with the other ingredients in the round bottom flask in order to remove surface oxides. The mixture is stirred for one week in the round bottom flask in an inert atmosphere at room temperature. Afterward, the flask is removed from the inert atmospheric conditions. The potassium is removed and cleaned in a series of washes with t-butyl alcohol, methanol, and water. The reaction product is isolated by centrifugation and decantation of the liquid. Transmission electron microscopy shows the presence of CNTs in the reaction products, with observable diameters on the order of 15-20 nm. Raman spectroscopy shows graphitic peaks corresponding to MWNT growth.

Example 5

Iron PPI Dendrimer 16:1 CNT Grown in Pentane

In an inert atmosphere 0.141 g of the catalyst of Example 1 is combined with 25 mL of pentane in a high pressure tube. Tetrachloroethylene, 8.0 mL, and solid potassium, 2.71 g, prepared as in Example 4, is placed in the tube with the pentane and the tube is sealed. The pentane is refluxed at 50° C. in the tube for 96 hours plus 48 hours for a total of 144 hours. The total pressure inside the reactor is less than 100 psi. After reaction, the potassium is removed and cleaned in a series of washes with t-butanol, methanol, and water. A black product is collected, with an aliquot analyzed by TEM, and another portion being cleaned from amorphous carbon growth by washing in nitric acid for 12 hours with sonication. TEM analysis shows nanotube growth in both the as-deposited and acid-washed products, with more nanotubes being observed in the latter product.

Example 6

Carbon Nanotubes 3 mL carbon tetrachloride are placed in a 10 mL beaker. 0.006 g of the iron encapsulated dendrimer of Example 5 and 8 mL of methanol are placed in a vial with excess copper wire wrapped around it. The vial is placed in the beaker, and the beaker and vial are placed in a $CO_2$ reactor at a pressure of 1200 psi and kept at 125° C. for 24 hours. After reaction, the vial containing the iron dendrimer contains a black solid. No solvent or liquid is left in either container and the copper wire appears corroded. Examination by transmission electron microscopy reveals the presence of CNTs.

Example 7

$CI_4$, Iron in Dendrimer in SFr 0.0055 g of the iron encapsulated dendrimer of Example 5 is placed in an 8 mL vial with 2 mL of ethanol, and stirred for a short time to disperse the dendrimer material. Copper wire is wrapped around the top of the vial. 0.15 g of carbon tetraiodide is placed in a 10 mL beaker. The vial containing the dendrimer and copper wire is placed in the beaker. Both the vial and beaker are placed together in a small SFT reactor. Carbon dioxide is added to a pressure of 900 psi, and the reaction is run at a temperature of 175° C. for 24 hours. The product is washed with ethanol to remove the iodine side-product, and separated into as-deposited and acid-washed portions. TEM analysis confirms the presence of CNTs within both portions, with Raman spectroscopy confirming CNT growth in the acid-washed sample.

Although the invention has been described above with respect to various preferred embodiments, it is to be understood that the invention is not limited to the embodiments disclosed. The description is merely exemplary in nature and, thus, variations that do not depart from the gist of the invention are intended to be within the scope of the invention. Variations and modifications such as will occur to the person of skill in the art upon reading the description are also included within the scope of the invention, which is defined in the appended claims.

I claim:

1. A low temperature method for synthesizing carbon nanotubes, comprising
   decomposing a carbon source in a fluid in the presence of a catalyst under conditions where the catalyst catalyzes formation of a carbon phase comprising nanotubes;
   wherein the carbon source comprises a halogenated hydrocarbon and the catalyst comprises a metal-encapsulated macromolecule, wherein the metal is selected from the group consisting of Ti, V, Cr, Mn, Fe, Co, Ni, Cu, Mo, and W.

2. A method according to claim 1, comprising heating the carbon source in the further presence of a sacrificial metal, wherein the sacrificial metal comprises a metallic compound provided in a form such that halogen from the decomposition of the carbon source reacts with the sacrificial metal.

3. A method according to claim 1, wherein the catalyst comprises a dendrimeric material.

4. A method according to claim 2, wherein the metal of the metal encapsulated macromolecule comprises iron.

5. A method according to claim 1, wherein decomposing the carbon source comprises heating the carbon source to a temperature of about 200° C. or less.

6. A method according to claim 1, wherein decomposing the carbon source comprises heating the carbon source to a temperature of about 50° C. to about 200° C.

7. A method according to claim 1, wherein the fluid comprises a supercritical fluid.

8. A method according to claim 7, wherein the fluid is selected from the group consisting of carbon dioxide, krypton, xenon, ethane, methane, and propane.

9. A method according to claim 7, wherein the fluid comprises supercritical carbon dioxide.

10. A method according to claim 2, wherein the fluid comprises a supercritical fluid and the sacrificial metal is selected from the group consisting of Cu, Ti, V, Co, Ni, Fe, and Zn.

11. A method according to claim 10, wherein the sacrificial metal comprises Cu.

12. A method according to claim 10, wherein the sacrificial metal comprises Zn.

13. A method according to claim 1, wherein the fluid comprises an inert organic solvent.

14. A method according to claim 13, wherein decomposing the carbon source comprises heating the carbon source to a temperature of 200° C. or less.

15. A method according to claim 13, wherein decomposing the carbon source comprises heating the carbon source to a temperature of 100° C. or less.

16. A method according to claim 13, wherein decomposing the carbon source comprises heating the carbon source to a temperature of 80° C. or less.

17. A method according to claim 13, comprising refluxing the solvent.

18. A method according to claim 17, wherein the solvent comprises benzene.

19. A method according to claim 17, wherein the solvent comprises pentane.

20. A method according to claim 2, wherein the sacrificial metal is selected from the group consisting of alkali metals and alkaline earth metals.

21. A method according to claim 2, wherein the sacrificial metal comprises K.

22. A method according to claim 1, wherein the carbon source comprises a tetrahalomethane.

23. A method according to claim 22, wherein the carbon source comprises carbon tetrachloride.

24. A method for synthesizing carbon nanotubes, the method comprising:
heating a carbon source in a supercritical fluid in the presence of a catalyst and a sacrificial metal for a time and at a temperature sufficient to decompose the carbon source and form a carbon phase comprising nanotubes wherein:
the carbon source comprises a halogenated hydrocarbon,
the sacrificial metal comprises a metallic element that reacts with halogen from decomposition of the carbon source and the catalyst comprises a metal encapsulated dendrimeric material,
wherein the metal is selected from the group consisting of Ti, V, Cr, Mn, Fe, Co, Ni, Cu, Mo, and W, and combinations thereof.

25. A method according to claim 24, wherein the carbon source comprises $CX_4$, wherein X is independently selected from the group consisting of chlorine, bromine, and iodine.

26. A method according to claim 24, wherein the carbon source comprises carbon tetrachloride or carbon tetraiodide.

27. A method according to claim 24, wherein the supercritical fluid comprises carbon dioxide.

28. A method according to claim 27, comprising heating the carbon source to a temperature of 200° C. or less.

29. A method according to claim 27, comprising heating the carbon source to a temperature of 175° C. or less.

30. A method according to claim 24, wherein the sacrificial metal comprises copper or zinc.

31. A method according to claim 24, wherein the metal of the metal encapsulated dendrimeric material comprises iron.

32. A method according to claim 31, wherein the catalyst comprises a metal encapsulated dendrimer.

33. A method according to claim 31, wherein the catalyst comprises a metal encapsulated hyperbranched molecule.

34. A method according to claim 24, wherein the dendrimeric material has a diameter of about 10 nm or less.

35. A method according to claim 24, wherein the dendrimeric material has a diameter of about 5 nm or less.

36. A method according to claim 24, wherein the dendrimeric material has a diameter of about 3 to about 5 nm.

37. A method according to claim 24, wherein the catalyst comprises a metal encapsulated dendrimer.

38. A method according to claim 37, wherein the dendrimer is selected from the group consisting of PPI and PAMAM.

39. A method according to claim 24, wherein the dendrimeric material comprises a Generation "4" PPI dendrimer.

40. A method according to claim 24, wherein the carbon source comprises carbon tetrachloride and the sacrificial metal comprises zinc or copper.

41. A method for synthesizing carbon nanotubes, comprising:
contacting a solution of a halogenated hydrocarbon in an organic solvent with a catalyst comprising a metal encapsulated dendrimeric material in the further presence of an active metal; and
maintaining the contacting for a time and at a temperature sufficient to decompose the halogenated hydrocarbon and form a carbon phase comprising nanotubes,
wherein the metal encapsulated dendrimeric material comprises a catalyst metal selected from the group consisting of Ti, V, Cr, Mn, Fe, Co, Ni, Cu, Mo, and W;
the active metal is selected from the group consisting of sodium, potassium, and calcium; and
the solvent does not react with the active metal.

42. A method according to claim 41, wherein the halogenated hydrocarbon comprises $CX_4$ or $C_2X_4$, wherein X is independently selected from the group consisting of chlorine, bromine, and iodine.

43. A method according to claim 41, wherein the solvent comprises a hydrocarbon.

44. A method according to claim 43, wherein the solvent comprises benzene.

45. A method according to claim 43, wherein the solvent comprises pentane.

46. A method according to claim 41, wherein the metal encapsulated dendrimeric material comprises a metal in elemental form held on a dendrimer molecule having a diameter of about 10 nm or less.

47. A method according to claim 41, wherein the dendrimeric material comprises a Generation "4" PPI dendrimer.

48. A method according to claim 41, wherein the solvent comprises benzene, the active material comprises potassium, and the metal encapsulated dendrimeric material comprises Fe° on a Generation "4" PPI dendrimer.

49. A method according to claim 41, wherein the temperature is less than or equal to 200° C.

50. A method according to claim 41, wherein the temperature is less than or equal to 150° C.

51. A method according to claim 41, wherein the temperature is less than or equal to 100° C.

52. A method according to claim 41, wherein the temperature is less than or equal to 85° C.

53. A method according to claim 41, wherein the temperature is less than or equal to 50° C.

54. A method according to claim 41, wherein the temperature is about room temperature.

55. A method according to claim 41, wherein the temperature is 25° C. or less.

56. A method for making carbon nanotubes comprising:
heating a carbon source in supercritical carbon dioxide in the presence of a sacrificial metal and a metal encapsulated dendrimeric catalyst particle; wherein
the carbon source comprises $CX_4$, wherein X is independently selected from the group consisting of chlorine, bromine, and iodine;
the sacrificial metal comprises a metallic element in the zero oxidation state that does not react with the carbon dioxide under supercritical conditions, and
the dendrimeric catalyst particle comprises a metal selected from the group consisting of Ti, V, Cr, Mn, Fe, Co, Ni, Cu, Mo, and W.

57. A method according to claim 56, wherein the catalyst particle comprises a dendrimer molecule with a diameter of about 10 nm or less.

58. A method according to claim 57, wherein the diameter is about 5 nm or less.

59. A method according to claim 57, wherein the diameter is about 3 to about 5 nm.

60. A method according to claim 56, comprising heating to a temperature of 200° C. or less.

61. A method according to claim 56, wherein the sacrificial metal is selected from the group consisting of copper and zinc.

62. A method according to claim 56, wherein the sacrificial metal comprises copper.

63. A method according to claim 56, wherein the catalyst particle comprises Fe° held on an amine-terminated dendrimer.

64. A method according to claim 56, wherein the catalyst particle comprises Fe° held on a hydroxyl-terminated dendrimer.

65. A method according to claim 63, wherein the dendrimer comprises a Generation "4" PPI dendrimer.

66. A method for making carbon nanotubes comprising:
decomposing a carbon source comprising $CX_4$ in a fluid in the presence of a metal encapsulated dendrimeric catalyst and a sacrificial metal;
wherein the fluid is selected from the group consisting of a supercritical fluid and a liquid;
X is a halogen independently selected from the group consisting of chlorine, bromine, and iodine;
the metal encapsulated dendrimeric catalyst comprises a zero oxidation state metal selected from the group consisting of Ti, V, Cr, Mn, Fe, Co, Ni, Cu, Mo, and W; and
the sacrificial metal comprises a metallic element that reacts with halogen from the decomposition of $CX_4$ but does not react with the fluid.

67. A method according to claim 66, wherein the fluid comprises a supercritical fluid selected from the group consisting of $CO_2$, xenon, krypton, methane, ethane, and propane.

68. A method according to claim 66, wherein the fluid comprises $CO_2$.

69. A method according to claim 66, wherein the fluid comprises a liquid hydrocarbon.

70. A method according to claim 69, wherein the liquid comprises benzene.

71. A method according to claim 66, wherein $CX_4$ comprises carbon tetrachloride.

72. A method according to claim 66, wherein $CX_4$ comprises carbon tetraiodide.

73. A method according to claim 66, wherein the fluid comprises supercritical carbon dioxide and the sacrificial metal comprises copper or zinc.

74. A method according to claim 66, wherein the fluid comprises an organic hydrocarbon solvent and the sacrificial metal comprises sodium, potassium, magnesium, or calcium.

75. A method according to claim 66, wherein the fluid comprises an organic hydrocarbon solvent and the sacrificial metal comprises potassium.

76. A method according to claim 66, wherein decomposing the carbon source comprises heating the carbon source in a supercritical fluid at a temperature less than 200° C.

77. A method according to claim 66, wherein decomposing the carbon source comprises heating in an organic solvent at a temperature less than or equal to 200° C.

78. A method according to claim 66, wherein decomposing the carbon source comprises heating the carbon source in an organic solvent at a temperature less than or equal to 100° C.

79. A method according to claim 66, wherein decomposing the carbon source comprises heating the carbon source in an organic 30 solvent at a temperature less than or equal to 85° C.

80. A method according to claim 66, wherein decomposing the carbon source comprises heating the carbon source in an organic solvent at a temperature less than or equal to 50° C.

81. A method according to claim 66, wherein decomposing the carbon source comprises heating the carbon source in an organic solvent at a temperature less than or equal to room temperature or above.

* * * * *

UNITED STATES PATENT AND TRADEMARK OFFICE
CERTIFICATE OF CORRECTION

PATENT NO. : 7,556,789 B2
APPLICATION NO. : 10/556513
DATED : July 7, 2009
INVENTOR(S) : Bradley D. Fahlman It is certified that error appears in the above-identified patent and that said Letters Patent is hereby corrected as shown below:

ON THE TITLE PAGE, under No. (60), Related U.S. Application Data, insert --Provisional application No. 60/470,390, filed on May 14, 2003.--.

ON THE TITLE PAGE, under No. (57), Abstract insert:

--Low temperature methods for synthesizing carbon nanotubes (CNTs) comprise decomposing a halogenated hydrocarbon in a fluid in the presence of a catalyst where the catalyst catalyzes the formation of a carbon phase comprising nanotubes. The catalyst comprises a metal encapsulated macromolecule, wherein the metal is selected from the group consisting of Ti, V, Cr, Mn, Fe, Co, Ni, Cu, Mo, and W. In preferred embodiments, the catalyst comprises a metal encapsulated dendrimer molecule. Preferred dendrimer molecules include those that are amine functional, so that the metal is chelated, coordinated, encapsulated, or otherwise contained on the exterior or in the interior of the dendrimer molecule.--.

Column 10, line 32, "SFr" should be --SFT--.

Column 13, line 43, Claim 60, between "heating" and "to", insert --the carbon source--.

Column 14, line 42, Claim 77, after "heating", insert --the carbon source--.

Column 14, line 56, Claim 81, after "temperature", delete "or above".

Signed and Sealed this

Seventh Day of September, 2010

David J. Kappos
*Director of the United States Patent and Trademark Office*